(12) United States Patent (10) Patent No.: US 12,172,591 B2
Herrera (45) Date of Patent: Dec. 24, 2024

(54) VEHICLE-MOUNTED, SELF-CONTAINED, ALL-IN-ONE ENERGY STORAGE, ENERGY MANAGEMENT, AND ELECTRICITY SUPPLY SYSTEM

(71) Applicant: hatchTank LLC, Helotes, TX (US)

(72) Inventor: Matthis Herrera, Helotes, TX (US)

(73) Assignee: hatchTank LLC, Helotes, TX (US)

( * ) Notice: Subject to any disclaimer, the term of this patent is extended or adjusted under 35 U.S.C. 154(b) by 0 days.

(21) Appl. No.: 18/593,666

(22) Filed: Mar. 1, 2024

(65) Prior Publication Data

US 2024/0308454 A1 Sep. 19, 2024

Related U.S. Application Data

(60) Provisional application No. 63/453,076, filed on Mar. 18, 2023.

(51) Int. Cl.
*B60R 16/033* (2006.01)
*H01M 50/249* (2021.01)
*H02J 7/00* (2006.01)

(52) U.S. Cl.
CPC ......... *B60R 16/033* (2013.01); *H01M 50/249* (2021.01); *H02J 7/0063* (2013.01); *H01M 2220/20* (2013.01); *H02J 2207/20* (2020.01); *H02J 2207/40* (2020.01)

(58) Field of Classification Search
CPC .............. B60R 16/022; H01M 50/249; H01M 2229/20; H02J 7/0063; H02J 2207/20; H02J 2207/40
See application file for complete search history.

(56) References Cited

U.S. PATENT DOCUMENTS

| | | |
|---|---|---|
| 5,111,127 A | 5/1992 | Johnson |
| 6,965,818 B2 | 11/2005 | Koenig et al. |
| 7,795,837 B1 | 9/2010 | Haun et al. |
| 7,855,466 B2 | 12/2010 | Bax et al. |
| 10,424,943 B2 | 9/2019 | Wang et al. |
| 10,737,583 B2 | 8/2020 | Johnsen et al. |
| 2007/0267997 A1 | 11/2007 | Kanazawa et al. |
| 2008/0157593 A1 | 7/2008 | Bax et al. |
| 2009/0079161 A1 | 3/2009 | Muchow et al. |
| 2010/0292877 A1* | 11/2010 | Lee .......... B60L 50/66 180/68.5 |
| 2016/0190812 A1* | 6/2016 | Myer ............ H02S 30/10 307/21 |
| 2022/0039271 A1 | 2/2022 | Galloway |
| 2023/0396062 A1* | 12/2023 | Mills-Price ...... H02J 7/35 |

* cited by examiner

*Primary Examiner* — Robert L Deberadinis
(74) *Attorney, Agent, or Firm* — Pete Adams Law, PLLC

(57) ABSTRACT

The Vehicle-Mounted e-Generator (VMeG) is a self-contained, singular unit, vehicle- and trailer-mounted electrical energy storage and supply system with integrated inverter (s), energy storage, charging, management and control systems. The VMeG provides electrical power to vehicle-mounted tools, equipment, appliances, and their associated systems. The VMeG presented here is a vehicle-mounted, self-contained, battery, inverter, and charging system that is designed to be installed into/onto common types of work and recreational vehicles. The VMeG's functions are to provide electrical power to the same electrical components that traditional vehicle-mounted generators and vehicle-connected shore power are utilized for.

27 Claims, 6 Drawing Sheets

VEHICLE-MOUNTED, SELF-CONTAINED, ALL-IN-ONE ENERGY STORAGE, ENERGY MANAGEMENT, AND ELECTRICITY SUPPLY SYSTEM

CROSS-REFERENCE TO RELATED APPLICATIONS

This is a Non-Provisional U.S. patent application filed under 35 U.S.C. 111 (a). A priority claim is made to U.S. Provisional Patent Application No. 63/453,076, filed Mar. 18, 2023, which is incorporated in its entirety by reference.

BACKGROUND

(1) Field of the Invention

The present invention relates to the field of vehicle-mounted mobile electric power generation; as well as vehicle-installed electric power storage, inversion/conversion, and delivery systems with the primary purpose of providing mobile electrical power to auxiliary tools and equipment commonly installed on/attached to commercial field-service vehicles, recreational vehicles (RV), and military vehicles.

(2) Description of Related Art

There has long been a need for an AC and DC electrical power source to power vehicle-mounted auxiliary electrical, electromechanical, and electro-hydraulic equipment and tools. The predominant solution is gasoline-, diesel-, and propane-fueled prime mover internal combustion engine (ICE) generators, known as vehicle-mounted generators (VMG).

There is a multitude of government agencies, industries, companies, and independent operators who rely on mobile commercial work vehicles for transporting service essential equipment to remote locations where crucial work is performed or invaluable services are rendered. These work vehicles can be categorized by industry or use, such as the utility sector, service industry, fieldwork, repair work, etc. The associated vehicle-transported tools and equipment require electricity to start, run, and operate. Often, this electrical power demand is met by VMGs.

Unfortunately, while VMGs are well suited to produce the power needed by these applications, they present several issues for improvement. They produce environmentally harmful CO2 and air particulates that contribute to global warming and hazardous air quality. This harmful VMG exhaust is a byproduct of the combustion of fossil fuels. These fossil fuels are subject to highly volatile pricing and supply chain constraints and interruptions. Additionally, ICE generators have lots of mechanically moving parts that are subject to failure, require regular maintenance, and wear out beyond repair often. All these VMG shortcomings equate to higher operating costs and contribute to environmental pollution.

Being that there are few commercially available alternatives to the VMGs, as industries, companies, and individuals seek to reduce their operating costs (lower energy and maintenance costs) and fulfill their environmental goals, the greater the demand for hydrocarbon-free non-mechanical vehicle-mounted electrical power system alternatives becomes.

SUMMARY OF THE INVENTION

The invention, or device, as presented in this patent and all variations of the presented invention, will be referred to for the nonexclusive purpose of this patent as the Vehicle-Mounted eGenerator (VMeG); whereas "eGenerator" is a single-unit electricity storage and supply alternative to conventional internal combustion engine generators. The purpose of this VMeG invention term is to define and distinguish this novel category of vehicle-mounted electrical support and supply systems.

The VMeG represents most of the primary functions, features, embodiments, solutions, and operations of the invention. The novelty of this invention is that it embodies an all-in-one, self-contained, vehicle-mounted energy storage and inverter system for the primary purpose of providing power to non-powertrain electronics and equipment without an integrated combustion engine. The presented embodiments and all key components as defined in this patent are attached to or contained in a single enclosure (casing/housing). These key integrated components will be structurally secured to mechanical support structures on or within the enclosure.

As such, the VMeG system design incorporates several features that enable it to be a direct, drop-in, one-for-one replacement for common VMG types. Some of these features may include similar mounting elements and procedures, unit sizes and form factors (weight and dimensions), electrical connection locations and types, and electrical power output ratings.

The invention can be directly or indirectly secured to a vehicle or trailer chassis or frame via chassis or frame mounts, cabinet mounts, an enclosed or exposed mounting surface, and mounting brackets (i.e. hanging, L-brackets, side brackets, etc.).

The invention's electrical output circuits are primarily intended to be wired to electrical distribution panels (bus bars, breaker panels, fuse panels) that connect to auxiliary electrical equipment such as HVAC systems, refrigerators/freezers, microwaves, water heaters, electronics, electrical outlets, etc., and auxiliary electrical-mechanical equipment such as hydraulic pumps, electrical motors, handheld tools, etc., non-drivetrain powered equipment, utility equipment, and any other electrical loads that are either directly or indirectly connected to work, utility, recreational, or military vehicles.

BRIEF DESCRIPTION OF THE DRAWINGS

Having thus described the invention in general terms, reference will now be made to the accompanying drawings, which are not necessarily drawn to scale or proportion. The components used in these figures are not necessarily actual brand, make, or model components that will be used in any particular VMeG model or variation. The component locations are not specific to any particular VMeG model or variation. The primary functions that each component within the VMeG performs should for the most part remain the same throughout most VMeG models, variations, and design iterations.

Figure 1:
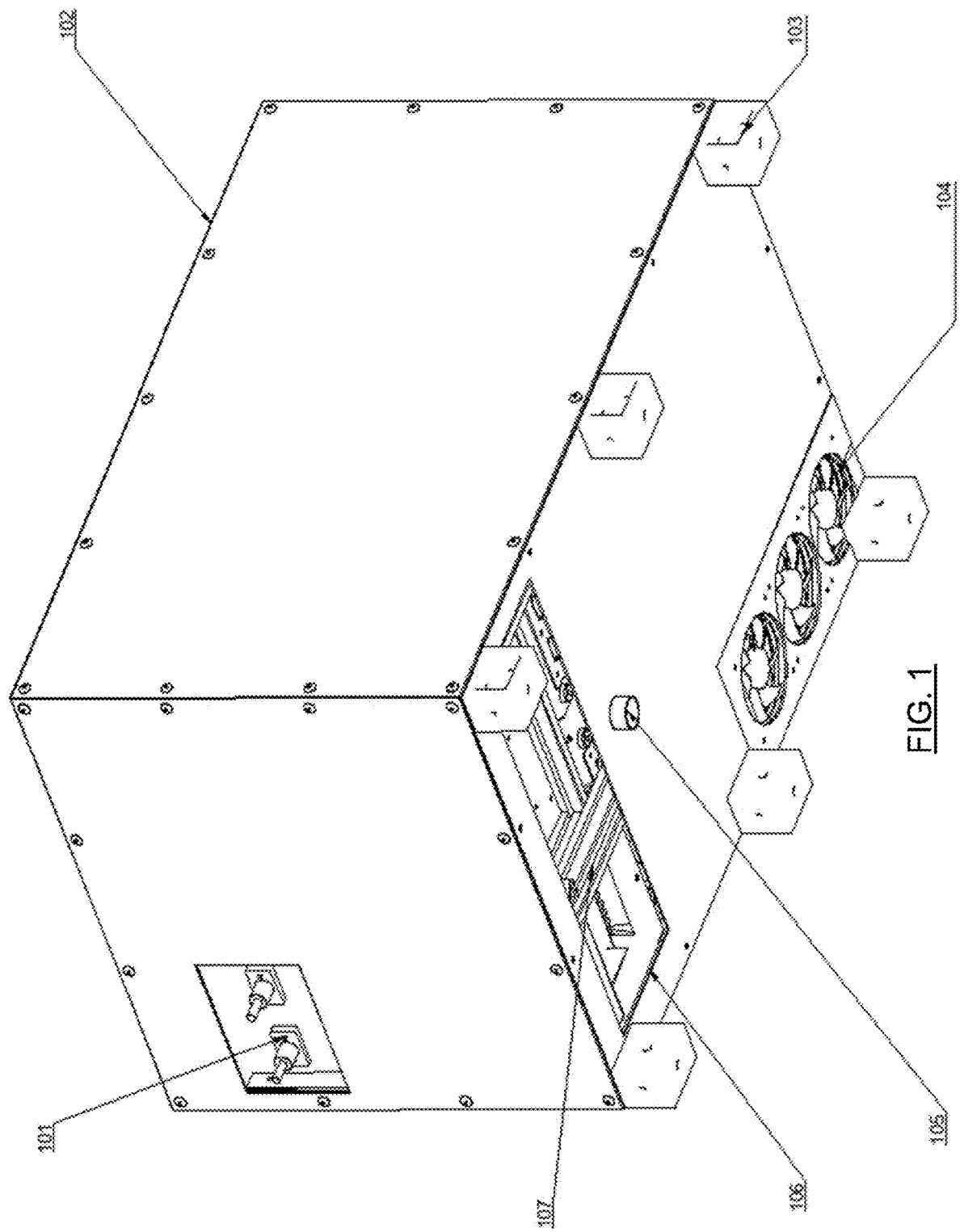

FIG. 1 is a North East isometric view of the VMeG system.

Figure 2:
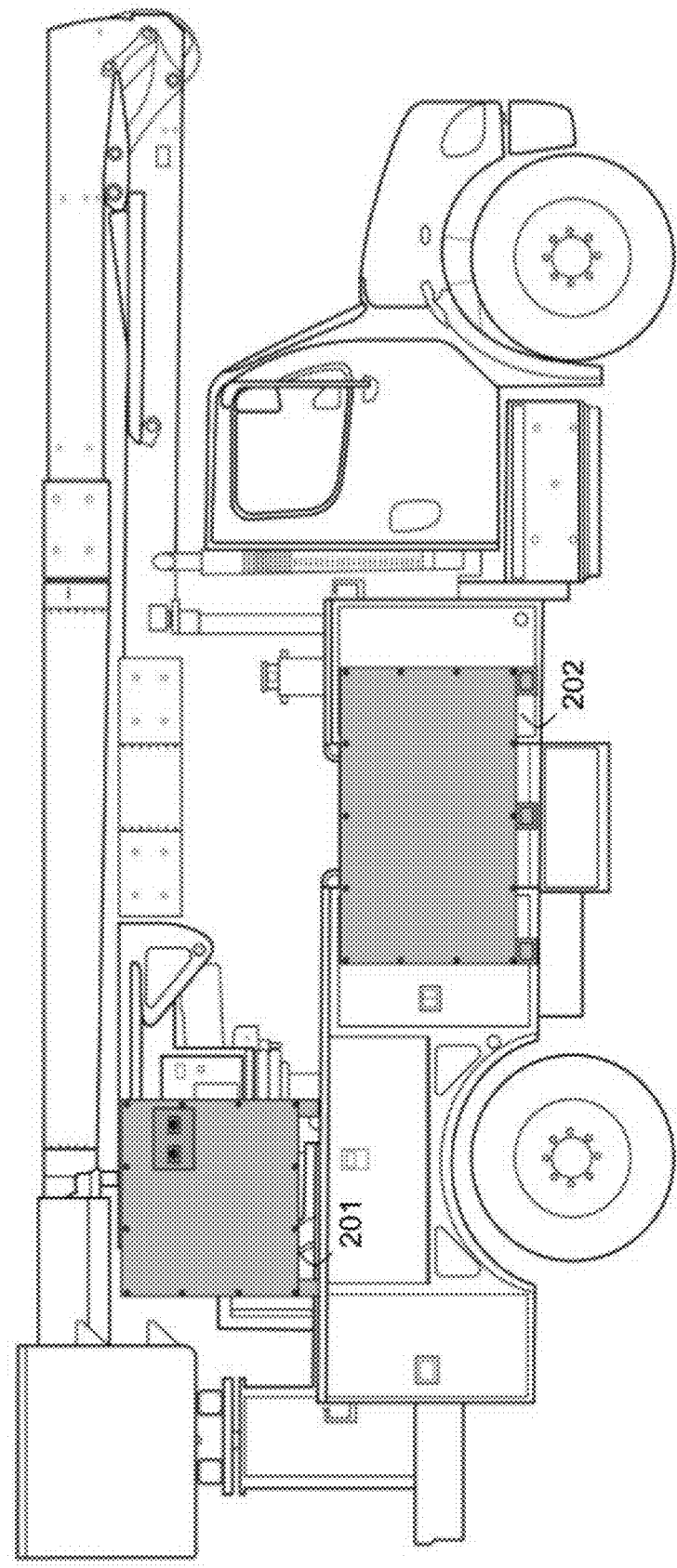

FIG. 2 shows perspective views of the VMeG installed at two potential locations on a bucket (aerial lift) truck.

Figure 3:
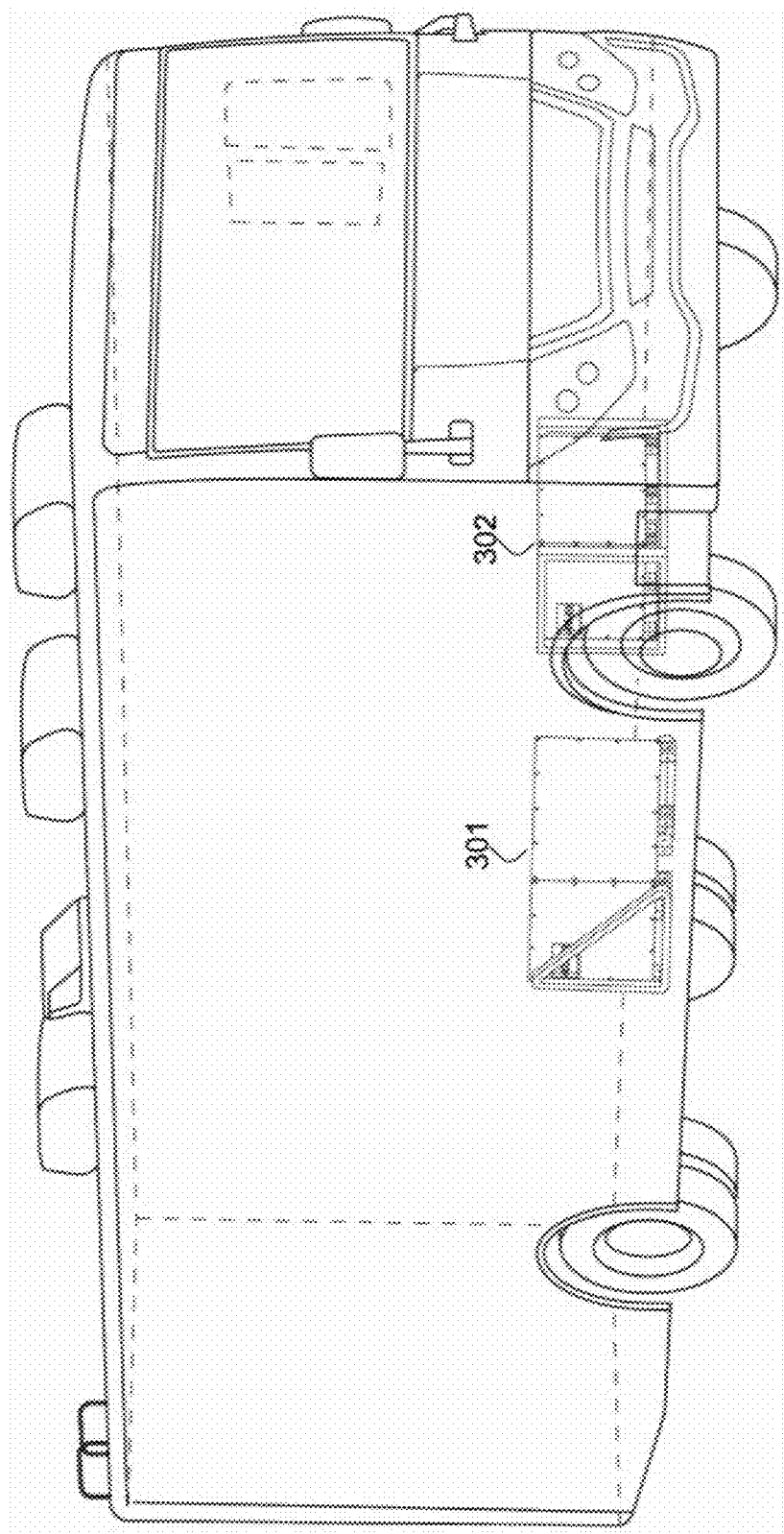

FIG. 3 shows perspective views of the VMeG installed at two potential locations on a recreational vehicle (RV). Additionally shown are the supporting hardware for two mounting methods, Rack mounting and Bracket mounting.

Figure 4:
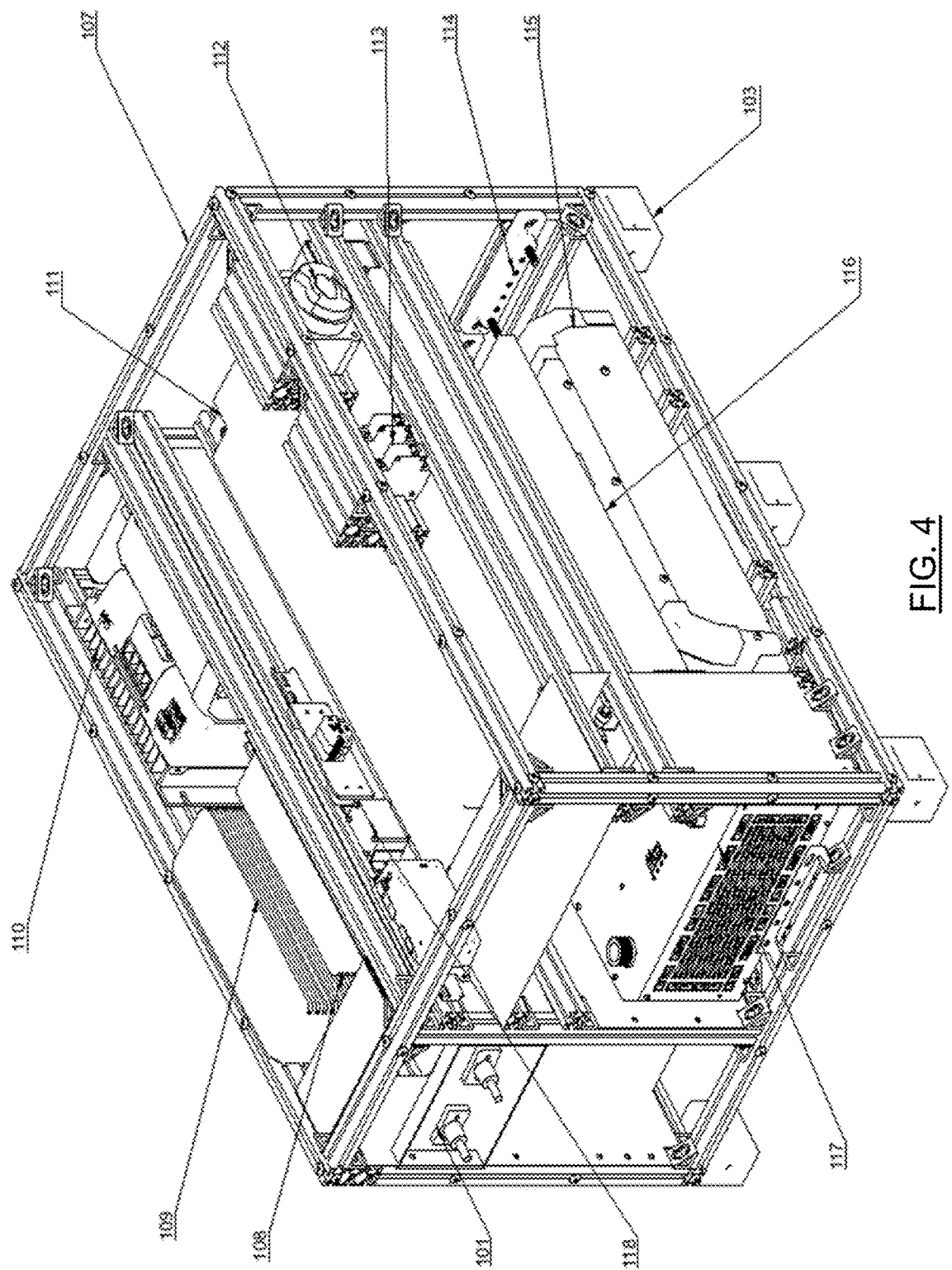

FIG. 4 is a North East isometric cutaway view of the VMeG showing potential internal components to be referenced throughout the sections as visual representation.

Figure 5:
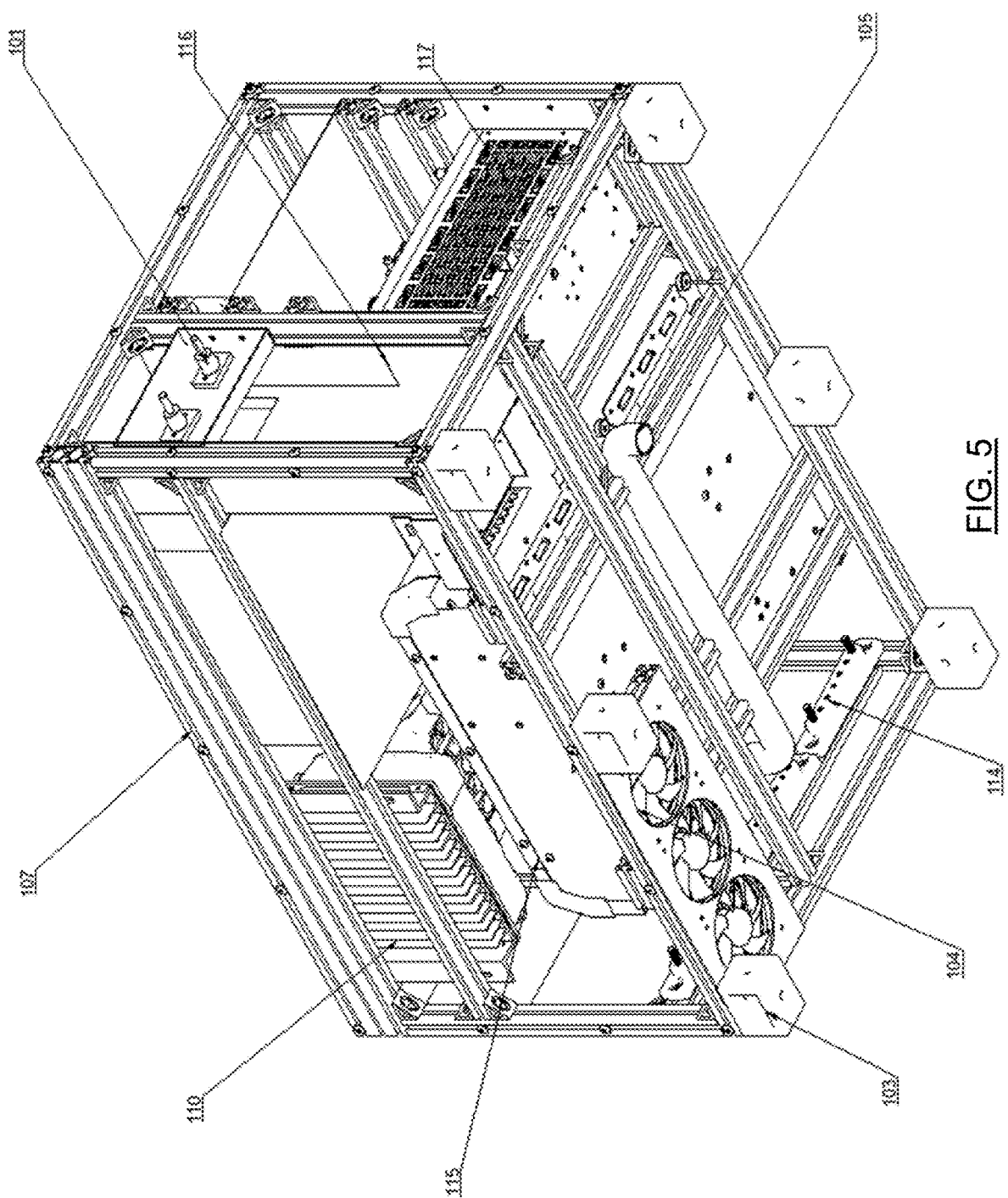

FIG. 5 is a South West isometric cutaway view of the VMeG showing potential internal components to be referenced throughout the sections as visual representation.

Figure 6:
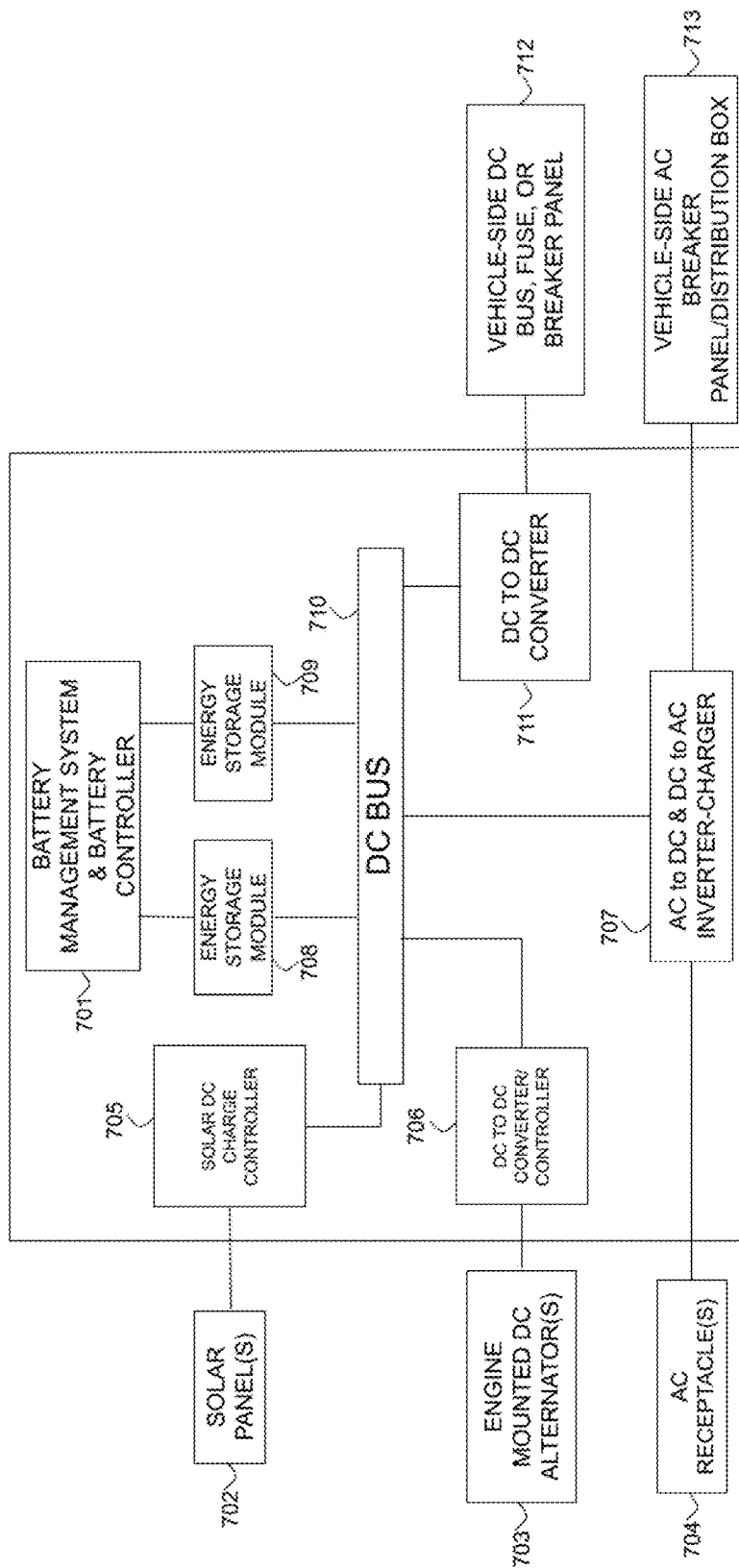

FIG. 6 is a diagram of the Charging and Power Supply wiring/circuits of the VMeG.

DETAILED DESCRIPTION OF THE INVENTION

The invention will now be described more fully hereinafter through reference to various embodiments. These embodiments are provided so that this disclosure will be thorough and complete, and will convey the scope of the invention to those skilled in the art. Indeed, the invention may be embodied in many different forms and should not be construed as limited to the embodiments set forth herein; rather, these embodiments are provided so that this disclosure will satisfy applicable legal requirements.

As used in the specification, and in the appended claims:
a. The singular forms "a", "an", and "the", include plural referents unless the context clearly dictates otherwise;
b. The use of "and" and "or" does not specifically mean in addition to or alternatively, but is implied to include both the additive and alternative forms of the term implemented in the text to enhance the readability of the document;
c. The use of "at least" and "one or more" implies that it is not limited to a singular;
d. The use of "to", "on", "in" or "through" a component or embodiment of the system implies the substitution of these prepositions. For example "to" may also cover a "through" application;
e. "Via" encompasses on and through something, by means of, and utilizing.
f. The VMeG may also be referred to as the "invention", "system", or the "device";
g. "Vehicle" refers to wheeled, tracked, railed, or skied land vehicles, including vehicle towable trailers, and watercraft;
h. "Vehicle-mounted" equipment is defined as non-drivetrain equipment that is mechanically, physically, or electrically attached to, connected to, installed on, or installed in a vehicle.
i. "Equipment" includes tools, appliances, fixtures, systems, and anything else that is non-permanently, semi-permanently, or permanently attached or connected to the vehicle or the VMeG;
j. An "electrical connection", "electrical power interface", and "output connection" as referenced throughout includes Alternating Current (AC), Direct Current (DC), bidirectional, and unidirectional; whereas an intentional mechanical connection is made that allows electricity to flow, transmitted, via the connection.
k. "Wire" includes electrical cord, cable, and conduit.
l. A "distribution panel" is an intermediary device that encompasses: distribution panel, distribution box, breaker, breaker box, breaker panel, fuse, fuse box, fuse panel, bus, busbar, load panel, and transfer switch 712 and 713.
m. "Load" is a demand circuit, and "source" is a supply circuit. Load and source circuits can be discrete or one and the same. Load circuit can also be referred to as an "output" circuit, and supply circuit can also be referred to as a "input" circuit.
n. A "transfer switch" is an electrical source selection switch or load selection switch. It allows for changing between multiple electrical sources or multiple load circuits.
o. "Energy storage" is a device that stores energy, also known as an accumulator and a battery. These devices include chemical (electro-chemical), electrical potential (static electricity or electrostatic charge), latent heat, radiation, and kinetic. The energy can be stored in or on liquid, gas, gel, solid, or phase change medium, form, substance, or substrate; and be contained and configured in a bank, pack, module, single cell, multi-cell, container, canister, or tank.
p. "Charging system" can be AC to DC 707 or DC to DC 705 and 706, and can be unidirectional or bidirectional.
q. "Passthrough" for the purpose of passthrough powering is where an external power source provides electrical current through the VMeG without alteration, modified, inverted, or converted, bypassing the energy storage sub-system to an external load. Thus, the VMeG functions as an intermediary power provision provider.
r. "hybrid circuit" is one that combines two or more electrical sources into a single output circuit.
s. "turning on" refers to engaging or starting the flow or operation of an external power source. Such as, turning on an internal combustion generator or fuel cell generator.
t. "turning off" refers to disengaging, stopping the flow or operation of an external power source. Such as, turning off an internal combustion generator or fuel cell generator.
u. "Autonomously" is an action or operation where the VMeG performs tasks, with or without human input or active supervision. Each action or operation is a function of the manufacturer's programmed or operator-specified parameters.
v. "Bolt" is a rod or pin for fastening objects together that usually has a head at one end and a screw thread at the other and is secured by a nut. "Fastener" can be used in lieu of "bolt", as fasteners are hardware devices that mechanically join or affix two or more objects together.

One embodiment of the VMeG that can be seen in FIG. 1 is an enclosure 102 that can be mounted within a vehicle's or vehicle-towable trailer's physical profile, or attached externally to the vehicle's or trailer's physical profile. The enclosure can have a top, bottom, and four sides. Provisions may be made for predetermined air inlet and outlet locations, electrical connection and passthrough locations, and any access doors and panels necessary for the operation of the device.

This VMeG is intended to be a direct, one-for-one replacement for common vehicle-mounted generators. As such the provided example in most cases conforms to industry standard mounting schemes, methods, configurations, and orientations, and utilizes conforming mounting hardware to what is used to mount traditional VMGs. This design consideration allows for ease of physical installation onto VMG-designated receiving and securing spaces and locations, as well as non-designated spaces and locations. The purpose of this feature is to ensure that there are little to no modifications needed to the vehicle, or trailer, and its generator mounts to install, secure, and connect this VMeG to all applicable mobile platforms.

There are several key functions that the VMeG is intended to perform. These internal operations include charging internal electrical energy storage modules, packs, banks, and cassettes 111 (shown in FIG. 4), 708, and 709 (shown in FIG. 6), as well as monitoring and protecting the electrical energy storage system, providing AC 707 and 713 and DC 711 and 712 power to external loads, protecting all internal and external loads from hazardous electrical conditions, preventing or mitigating hazardous electrical and mechanical conditions, and providing a human-machine interface (HMI) that allows the operators, technicians, and operations personnel to monitor and control the VMeG. These operations will now be described in detail.

One of the most fundamental components of this invention is the electrical energy storage 111 (shown in FIG. 2), 708, and 709 (shown in FIG. 6). This design may include multiple energy storage modules, packs, banks, cassettes or other forms of different sizes depending upon the application. Energy storage modules 111 (shown in FIG. 2), 708, and 709 (shown in FIG. 6) may be connected in series or parallel per the voltage and amperage specifications of the VMeG model. The system may be able to select (switch between) individual storage modules, or groups of storage modules, to best achieve the desired electrical scenarios based on a multitude of factors. The VMeG example presented in the figures of this patent utilizes Lithium-Ion battery modules 111 as the primary internal electrical energy storage. The nominal operating voltages of the VMeG's energy storage system's currently designed applications will typically range in voltage from 12 VDC to 48 VDC, however, the invention is not limited to this voltage range.

Example types of energy storage this invention may use, but are not limited to:
 a. Lithium Batteries;
 b. Solid-state batteries;
 c. Sodium batteries or capacitors;
 d. Ceramic batteries or capacitors,
 e. Polymer batteries or capacitors;
 f. Graphene batteries or capacitors;
 g. Capacitors to include supercapacitors;
 h. Hybrid battery-capacitors;

Other, secondary energy storage devices, such as capacitors, may be utilized for internal system operations and electrical output conditioning and optimization.

Energy storage modules may be removable cassette-type storage modules. These energy storage types may be removable modules that dock into a receiving and securing charging and discharging dock system. This can be a cassette-type multi-module system allowing for easy removal and installation of energy storage modules (packs) without removing the VMeG unit from its installed location. Utilizing an integrated securing and connection slotted cassette rack, each cassette can be individually removed by users without having to manually detach or disconnect the energy storage modules' mechanical, electrical, data, or thermal management system individual connections.

Energy storage may be liquid holding tank(s) for Redox Flow applications.

Energy storage may be pressurized gas or liquefied gas cylinders for Fuel Cell applications.

While not required for the operation of the VMeG, additional external energy storage banks, packs, or modules may be connected to the VMeG to augment or supplement the invention's internal energy storage capacity. This may include: Electrical Vehicle (EV) original equipment manufacturer (OEM) batteries through an OEM-provided auxiliary connection that the VMeG can connect to or a third-party adapter; a connection to vehicle-installed Redox Flow liquid tanks; or vehicle-installed Fuel Cell pressurized gas or liquefied gas cylinders.

VMeG models and variants may have a Redox Flow battery system where chemical energy is converted into electrical energy through reversible oxidation and reduction of working fluids. This process happens in an electrochemical cell where chemical energy is provided by two chemical components dissolved in liquids that are pumped through the system on separate sides of a membrane. Through this process, one fluid gives up electrons that go through an external circuit, creating a flow of electricity. The fluids may be stored in internal or external reservoirs or be supplied from external sources.

VMeG models and variants may have Fuel Cell generators where a fuel, such as hydrogen, is fed to the anode and air is fed to the cathode of a fuel cell. A catalyst at the anode separates fuel molecules into protons and electrons, which both take different paths to the cathode. The electrons go through an external circuit, creating a flow of electricity. The fuel may be stored in internal or external reservoirs or be supplied from external sources.

A DC vehicle-to-vehicle NATO receptacle (aka, slave/booster cables receptacle) (e.g. NSN 5935-00-567-0128, 5935-01-369-0796, 5935-99-802-2423, US Army PN 11682338 or P/N TGC2600, P/N TGC2700 or P/N 11674728) may be incorporated into the device so that military vehicles can share power from the device or the device can be charged or powered from another NATO-conforming charging source, such as another vehicle, via NATO-style slave cables.

Monitoring and protecting the energy storage systems is accomplished through the use of a battery management system (BMS) as well as various control components 701 i.e. thermal management systems, electromechanical relays, on/off switches, fans, etc. The various control electronics 118 components can include temperature sensors, heaters, liquid cooling systems, fans, microcontrollers, single board computers, and any other component that could be used to monitor and control the energy storage system's temperatures, voltages, charge and discharge rates and cutoffs, states of charge, cell balance, etc.

The system will contain at least one electrical power inverter 115 (shown in FIG. 4) and 707 (shown in FIG. 6) for the primary purpose of providing AC power to external loads 713 (shown in FIG. 6) from DC energy storage systems. The inverter(s) 115 (shown in FIG. 4) and 707 (shown in FIG. 6) may also provide AC directly from an external DC source, such as a vehicle engine-mounted alternator 703 (shown in FIG. 6). The inverter 115 (shown in FIG. 4) and 707 (shown in FIG. 6) may also accept external AC sources for charging energy storage systems and can clean up any non-conforming electricity supply via demand frequency and voltage-conforming functions and capabilities. The number and size of the inverters 115 (shown in FIG. 4) and 707 (shown in FIG. 6) will depend on the size and capacity of the specific VMeG model or variant. The AC for this application will typically range in voltage from 110 to 240 VAC at 50 to 60 Hz frequencies. The DC input voltage range used by the inverter(s) 115 (shown in FIG. 4) and 707 (shown in FIG. 6) will typically range in voltage from 9 to 70 VDC. DC input voltage ranges may vary based on each application-specified VMeG model/variant. The inverters 115 (shown in FIG. 4) and 707 (shown in FIG. 6) and chargers used in each VMeG model/variant may be combined single multi-function inverter-charger 115 (shown in FIG. 4) and 707 (shown in FIG. 6) units or may be independent single-function inverters 115. Multiple inverters 115, and inverter-chargers 115 (shown in FIG. 4)

and 707 (shown in FIG. 6), may be connected in series or parallel to achieve the desired outputs (voltages and amperages).

Providing DC power to external loads 712 can be carried out in multiple ways. One method the VMeG can employ is the use of a voltage converter 108, 109 (shown in FIG. 4), and 711 (shown in FIG. 6) to step down or step up the voltage to something suitable for external loads. Another method is through a direct connection from the energy storage banks/modules/packs 111 (shown in FIG. 4), 708, and 709 (shown in FIG. 6) to terminals inside or on the side of the device.

Providing AC power to external loads 713 (shown in FIG. 6) can be accomplished through the VMeG's inverters 115 (shown in FIG. 4) and 707 (shown in FIG. 6); whereas inverter 115 (shown in FIG. 4) and 707 (shown in FIG. 6) devices convert the DC from the energy storage systems, or other DC sources, and transmit this converted electricity through terminals and outlets. Inverters may be combined with the chargers in single inverter/charger units.

In addition to the inverters 115 (shown in FIG. 4), the system may also contain independent chargers 705 and 706 (shown in FIG. 6) for the primary purpose of charging the energy storage system and any other internal electricity storage components. The job of the independent AC to DC charger(s) is to take AC sources and convert this electrical energy to application-conforming DC. As stated in the previous paragraph, AC to DC chargers may be combined with the inverters in single inverter/charger 707 units.

The DC to DC Step-Up Converter 108 (shown in FIG. 4), 705, and 706 (shown in FIG. 6). The device can contain voltage step-up converters 108 to enable the device to run on, charge the energy storage system, or work as a passthrough device to power external DC loads with lower DC source/supply voltages.

The device can contain voltage step-down converters 109 (shown in FIG. 4) to enable the device to run on, charge the energy storage system, or work as a passthrough device to power external DC loads 712 (shown in FIG. 6) with lower DC source/supply voltages.

The system may contain a charge controller 110 (shown in FIG. 4) to regulate solar and wind turbine-generated 705 (shown in FIG. 6) supply amperage and voltage. Common example charge controllers 110 are the maximum power point tracking controller (MPPT) and the pulse width modulation controller (PWM). The purpose of an integrated charge controller 110 (shown in FIG. 4) is to enable the VMeG to run on or charge from solar photovoltaic panels 702 (shown in FIG. 6) or a wind turbine generator which can be physically attached or detached from the vehicle.

A means for monitoring and controlling the temperature of internal and integrated energy storage systems, temperature-sensitive components, and the enclosure thermal environment is necessary to protect the system from any heat- or cold-related damage that might occur if left unregulated. This thermal management system 117 (shown in FIG. 4), or thermal control process, and the associated systems are essential for keeping the energy storage banks/modules/packs 111 (shown in FIG. 4), 708, and 709 (shown in FIG. 6) and electronic components within their specified thermal operating ranges to safeguard the system from adverse and dangerous temperature-related conditions. The system may contain components used for temperature regulation such as a vapor compression refrigeration unit, fans, pumps, compressors, and heating elements to conduct the tasks of cooling and heating components for the purpose of thermal management.

In addition to, or as part of, the thermal management system 117, a separate fan assembly 104 (shown in FIG. 3), may be used to pull in external air, exhaust internal air, and circulate air throughout the enclosure to ensure that all air-cooled components are effectively cooled via convective heat transfer. The fans may be mounted either at the predetermined air flow outlet, inlet, internally, or at multiple locations based on the system component configuration.

Various electronic components may be used for thermal management, protection of the components, and the implementation of safety measures. These control electronics 118 (shown in FIG. 4) and 701 (shown in FIG. 6) may include a battery management system (BMS), microcontrollers or other microcomputers, relays, and any other electrical or electromechanical components related to system controlling activities.

Busbars 114 (shown in FIG. 4) and 710 (shown in FIG. 6) may be used in multiple locations as a method of power distribution. They may be used on both AC and DC circuits and may be of varying amperage and voltage ratings appropriate for the application.

External in- and out-circuit AC 704 and 713 (shown in FIG. 6) and DC Terminals 101 (shown in FIG. 4) may be located in the same general location as on conventional VMG models and rated for the appropriate current for the given VMeG model/variant and the systems it is connected to. These terminals 101 may serve as the primary means for connecting vehicle-mounted and vehicle-connected electrical and electronic equipment and electrical systems to the VMeG to provide the required electricity.

Protection from electrical hazards to internal components, exposed external connections, and risk of electrical shock to living beings may be accomplished through the use of electrical fuses, switches 112, breakers 113, and relays. In addition to these components, visible warning signs may be located near any potential hazards and physical barriers may be installed around potential hazards.

Fuses, breakers, and switches 113 may be used to protect the components in the system. At the very least there should be a fuse connected to the energy storage system to prevent them from discharging in a manner that could lead to hazardous situations, such as excessive charge and discharge (over amperage or voltage), thermal runaway, and electrical shorts that can cause damage to the VMeG and the equipment that is attached to it, as well as harm to living beings in the vicinity of the VMeG.

The VMeG as a whole will be enclosed to protect the internal components from potentially damaging environmental hazards such as weather, dirt, mud, sand, dust, rain, sun, etc. This exterior paneling 102 also exists to protect living beings from the hazards that may be present inside the VMeG. In addition to the enclosure paneling 102 (shown in FIG. 1), interior paneling (ducting) 116 (shown in FIGS. 4 and 5) may be used to duct the airflow to promote optimum air distribution and control internal temperatures and humidity, provide physical separation between components, and compartmentalize sections. Paneling can be flat sheets, molded, folded, or stretched forms and can be fastened together by any common means such as rivets, fasteners, adhesive, or welding.

Switches 112 such as a main DC disconnect switch 112 may be used to manually or automatically, mechanically or electromechanically, disconnect the energy storage from the rest of the VMeG system. There will be at least one manual or electronic primary service or energy storage emergency disconnect switch 112 incorporated into the device that can serve as a lockout or failsafe protection mechanism. External circuits disconnect switch(es) may also be installed in or on the VMeG.

For flow batteries and fuel cell systems, valves such as main shutoff valves or disconnects may be used to manually or automatically, mechanically or electromechanically, shut off the flow of energy storage fluids or gases from the rest of the VMeG system. There will be at least one manual or electronic primary service or energy storage emergency shut-off valve or line disconnect incorporated into the device that can serve as a lockout or failsafe protection mechanism. External shut-off valves and fine disconnects may also be installed in or on the VMeG.

The user Human-Machine Interface (HMI) may include an interactive touchscreen or an analog display with physical button controls. Access to the device may be possible via a remote electronic device such as a computer, smartphone, tablet, etc. These HMIs can be installed on the VMeG itself or remotely on or around the vehicle. Additional VMeG HMI may be accomplished through electronic device applications or via a web-based access portal.

Wireless communications, such as Bluetooth, Wi-Fi, cellular networks, and other wireless communication protocols and systems may be used to report system data and status, and offer remote monitoring and control. This includes the use of application programming interfaces (API), cloud-based, and decentralized networks.

VMeG models and variants may feature the ability to be electrically connected to each other to combine certain operations to provide greater utility and functionality. DC or AC inputs or outputs from one VMeG may be connected to, or combined with, inputs or outputs of another VMeG unit. This electrical connection and communication synchronization can be accomplished directly via direct parallel or series connections, or indirectly via an intermediary control unit. The purpose of connecting one or more VMeGs together can be to increase the total available storage capacity, input or output voltage, and input or output amperage. Connected units may or may not be of the same model/variant or have the same specification.

A metal frame 107, or substructure, may be used to physically support the components within or attached to the VMeG. This support structure can be made of, entirely or a combination of, metal, composite, or other suitable materials, and will be able to support the components from normal mechanical stresses they may experience from ordinary shipping and travel on vehicles. When installed on and secured correctly to a vehicle the frame 107 and associated structural components should also provide a reasonable safety factor to account for vehicle crash and collision scenarios.

The VMeG is designed to utilize some of the same, or similar, electrical connections and setups that conventional VMGs are currently utilizing.

The VMeG is designed to accept multiple charging and powering methods including shore power, vehicle alternator 703, renewable (e.g. solar 702 and wind), etc. AC 704 and 713 and DC power and charging receptacles, receivers, and sockets installed on the vehicle for the primary or secondary purpose of providing electricity to the VMeG system can be directly or indirectly connected to the VMeG via built-in AC and DC terminals 101. The VMeG can be connected to one or more of the following examples of charging and powering input methods:

a. Vehicle-mounted and non-vehicle-mounted solar charging 702 and 705 and powering can be accomplished with the use of standard MC4 push-connect fittings, or any other commonly used electrical fittings, or terminal connection(s).

b. Electrical shore power, whereas an RV or boat method of connecting to the electrical utility grid, microgrid, or virtual power plant (VPP) is utilized for the purpose of charging the VMeG.

c. VMeG units may include one or more of the standardized EV charging ports/connectors.

d. VMeG units may include wireless power transfer capabilities such as electromagnetic induction charging and powering.

e. Vehicle alternator 703 charging may be permitted.

f. The VMeG may be charged by an external generator.

g. In addition to unit direct hardwired connections, any of the aforementioned, subsequent, and unmentioned VMeG charging and powering methods may also be accomplished with built-in or remotely located and mounted electrical ports, outlets, receptacles, and terminals, as well as the vehicle's electrical wiring.

h. Charging connections into the VMeG may be accessed via access panel(s) on the unit or exterior-mounted terminals, plugs, ports, etc.

i. When a source is present, the device may automatically and autonomously begin charging per default or user-specified charging control programming, or settings.

j. The same DC charging connections may be utilized to power other VMeG components, or supply passthrough power through the VMeG to external loads. Additionally, DC in for non-charging purposes can be accomplished via circuits that are not part of or shared with the energy storage charging circuit(s).

k. The same AC charging connections 704 and 713 may be utilized to power other VMeG components, or supply passthrough power through the VMeG to external loads. Additionally, AC in for non-charging purposes can be accomplished via circuits that are not part of or shared with the energy storage charging circuit(s).

l. To supply electricity to distribution panels/boxes, transfer switches, busbars, breakers, fuses, or directly to the external loads 712 and 713, supply circuits can be established from the VMeG to the external demand circuits via vehicle-installed wires, wiring harnesses, or power cords. The connections to the VMeG can be made via terminals or electrical outlets accessible through the outer casing of the VMeG via wire conduit (s) 105 (shown in FIGS. 1 and 5) or duct(s) or via VMeG outer casing installed terminals 101 (shown in FIGS. 1 and 4) or outlets.

The electrical energy storage 708 and 709 may directly charge from an electrical source or via an intermediary component such as AC to DC inverter-charger(s) 707, DC to DC chargers 705 and 706, etc. The charging function can be accomplished via, but is not limited to, the following methods:

a. AC Shore Power plugs, outlets, adaptors, etc. 704;

b. AC or DC EV charging systems 707, 705 and 706;

c. AC or DC external generator 707, 705 and 706;

d. AC or DC vehicle alternator 703 (with or without rectifier(s));

e. Vehicle dynamo;

f. Photovoltaics (PV) 702;

g. DC or AC wind generator 705 and 706, and 707;

h. DC vehicle-to-vehicle NATO cables (aka, slave/booster cable);

i. a vehicle drivetrain-connected generator;

j. External energy storage systems.

The VMeG is designed to be mounted in the same locations that traditional VMGs are currently mounted in, as well as locations that are designed to accept and house traditional VMGs. The VMeG can be mounted to the undercarriage of vehicles, hung from vehicle-installed support brackets, located in vehicle compartments, mounted on top of vehicle surfaces, or on top of vehicle-mounted equipment, etc.

The VMeG can be hard mounted into and onto ground vehicles by specified VMeG manufacturer's securing bolt configurations (bolt location/pattern); whereas the VMeG manufacturer's approved installation and mounting methods will ensure that the physical connections and the proper load-bearing structures are combined for safe and secure transportation of the VMeG during normal (as established by the vehicle's original equipment manufacturer (OEM), outfitter, upfitter, coach manufacture, etc.) vehicle ground movements.

The VMeG can, but is not limited to, the following common vehicle-mounted generator mounting methods:

Mechanically installed and secured onto a vehicle's frame, chassis, subframe/chassis, or body, as seen in FIGS. 2 (201 and 202), with little to no additional mounting support structures. In this mounting method, a vehicle's frame, chassis, subframe, or body is the load-bearing support for the majority of the installed VMeG's mass.

In the rack-mounted method seen in FIG. 3, the majority of the installed VMeG's mass would not be directly mounted to the vehicle's frame, chassis, subframe, or body. Instead, it would be mounted utilizing structural support rack(s); whereas the VMeG will be mounted and bolted onto a rack that is hard-mounted to the vehicle's frame, chassis, body, or subframe. The rack may or may not have a VMeG load-bearing bottom surface.

The bracket-mounted method covers both vertical (hanging) frames 302 and horizontal bracket frames 301 for the VMeG. Brackets can be hung from the frame, chassis, sub-frame, or body of the vehicle whereas the bracket(s) secure the VMeG through mechanical means. In this mounting method, there is no load-bearing bottom surface support used for the purpose of securing or supporting the VMeG's mass.

Referring to FIG. 2, the vehicle floor-, bed-, and surface-mounted method is illustrated. In this mounting method, the VMeG can be directly secured on a flat horizontal supporting load-bearing surface such as truck bed floors 202 or on top of truck service bodies 201.

For the cabinet-mounted method, the VMeG is mounted inside a fully- or semi-enclosed vehicle-installed cabinet or compartment. In this method, the securing or mass support of the VMeG can be accomplished by one or more of the previously established mounting methods or any other VMeG manufacturer's or vehicle OEM's acceptable mounting or securing methods.

The invention claimed is:

1. A vehicle-mounted, self-contained, energy storage, energy management, and electrical power supply system comprising:
   a) a single enclosure having six sides;
   b) an interior space within the enclosure;
   c) at least one of: a door, an access panel, a removable enclosure side for providing access to the interior space;
   d) at least one mechanical connection point to securely mount the system to a vehicle or trailer with no additional mounting support structures;
   e) at least one rechargeable energy storage device to supply electricity from the system to a non-powertrain external circuit;
   f) wherein at least one electrical input power interface is provided via the enclosure to accommodate an external Alternating Current (AC) or Direct Current (DC) circuit connection to supply input electricity into the system to charge the energy storage device, power the system, and supply electricity from the system to a non-prime mover external circuit;
   g) wherein at least one input power interface connects to an electrical power output via at least one system's electrical component;
   h) wherein at least one power output connection is provided via the enclosure to accommodate at least one external AC or DC circuit connection to supply electricity from the system to an external circuit that powers non-vehicle vehicle-mounted, vehicle-installed, vehicle-carried tools, equipment, electronics, and appliances;
   i) at least one electrical charging system;
   j) at least one energy storage management system; and
   k) at least one DC to AC power inverter to supply electricity from the system to a non-vehicle external circuit.

2. The system of claim 1, wherein the enclosure interior space is greater than 4,500 cubic inches in total volume and less than 125,000 cubic inches in total volume.

3. The system of claim 1, wherein an electrical connection is established with at least one vehicle-mounted, vehicle-installed, vehicle-carried electrical distribution panel that serves as an intermediary non-vehicle electrical power device to at least one non-vehicle electrical equipment.

4. The system of claim 1, wherein at least one of the energy charging systems is a DC to DC converter.

5. The system of claim 1, wherein at least one of the energy charging systems is an AC to DC rectifier.

6. The system of claim 1, further comprising a manual or automatic input circuit transfer switch to switch between the system's multiple input supply circuits.

7. The system of claim 1, further comprising a manual or automatic output circuit transfer switch to switch between the system's multiple output supply circuits.

8. The system of claim 1, further comprising a hybrid circuit that combines at least two electricity circuits, allowing the system to simultaneously utilize multiple electricity sources for charging, operations, and output supply.

9. The system of claim 1, wherein the system includes at least one electrical circuit to a vehicle-side non-vehicle connection that provides electrical power to a demand-side device.

10. The system of claim 1, wherein the system engages an electrical power source, automatically turns on this power source to provide power to the system per the system's programming.

11. The system of claim 1, wherein the system disengages an electrical power source, automatically turns off an external power source to disengage power to the system per the system's programming.

12. The system of claim 1, wherein the external input electricity source is shore power.

13. The system of claim 1, wherein the external input electricity source is an electric vehicle (EV) charger.

14. The system of claim 1, wherein the external input electricity source is a generator.

15. The system of claim 1, wherein the external input electricity source is a vehicle alternator or a vehicle dynamo.

16. The system of claim 1, wherein the external input electricity source is a vehicle drivetrain-connected generator.

17. The system of claim 1, wherein the external input electricity source is photovoltaics (PV).

18. The system of claim 1, wherein the maximum sustainable DC output voltage is less than 300 volts.

19. A method of electrically powering non-vehicle vehicle-mounted, vehicle-installed, vehicle-carried, non-vehicle equipment via a vehicle-mounted, self-contained, energy storage, energy management, and electricity supply system, as recited in claim 1, the method comprising:
   a) connecting the system to at least one vehicle-side non-vehicle electrical connection; and
   b) providing electricity to at least one non-vehicle demand-side device.

20. The method of claim 19, further comprising: connecting an electrically conducting wire that provides electrical power from the system via a terminal to a vehicle-side non-vehicle distribution panel or load.

21. The method of claim 19, further comprising: connecting an electrically conducting wire that provides electrical power from the system via an electrical outlet to a vehicle-side non-vehicle distribution panel or load.

22. A method of charging a non-vehicle vehicle-mounted, self-contained, energy storage, energy management, and electricity supply system, as recited in claim 1, the method comprising:
   a) providing an electrical supply connection from an external source;
   b) transmitting a conforming electrical current from electrical supply connection to the system to provide a charging current via a charge controller to the energy storage.

23. A method of external powering a non-vehicle vehicle-mounted, self-contained, energy storage, energy management, and electricity supply system, as recited in claim 1, the method comprising:
   a) providing an electrical supply connection from an external source;
   b) transmitting a conforming electrical current from an external electrical supply connection to the system for the purpose of power system operations.

24. A method of passthrough powering non-vehicle vehicle-mounted, vehicle-installed, vehicle-carried, non-vehicle equipment via a vehicle-mounted, self-contained, energy storage, energy management, and electricity supply system, as recited in claim 1, the method comprising:
   a) providing an electrical supply connection from an external source;
   b) conducting a conforming electrical current from an external electrical supply connection to the system to provide passthrough power to a vehicle-side electrical connection.

25. A method of connecting a vehicle-mounted, self-contained, energy storage, energy management, and electricity supply system device, as recited in claim 1, to a vehicle, the method comprising:
   a) providing a mounting and securing structure with bolt holes;
   b) installing securing bolts in a vehicle-side bolt hole via at least one of the following mounting structures:
      I) directly to the vehicle's frame, chassis, subframe/chassis, or body;
      II) on a flat horizontal supporting load-bearing surface such as a vehicle floor, bed, or other applicable surfaces;
      III) a rack that is mounted in or attached to the vehicle's frame, chassis, subframe/chassis, or body;
      IV) a bracket that is mounted on or attached to the vehicle's frame, chassis, subframe/chassis, or body;
      V) mounted inside a fully- or semi-enclosed vehicle-installed cabinet or compartment; and
   c) mounting and securing the system to the vehicle.

26. The method of claim 25, further comprising: installing securing bolts in a system-side bolt hole by fastening the securing bolts into a vehicle- or system-side threaded receiving bolt hole or isolator mount.

27. The method of claim 25, further comprising: installing securing bolts through a bolt hole or isolator to a paired receiving-side threaded nut.

* * * * *